O. J. Smith,
Wrench,
N° 102,058. Patented Apr 19, 1870.
Fig. 1
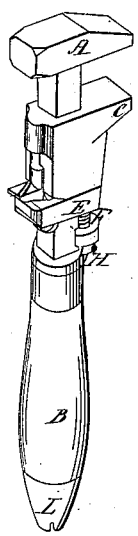
Fig. 2    Fig. 3
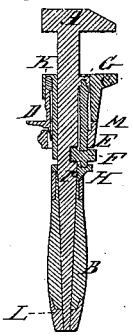 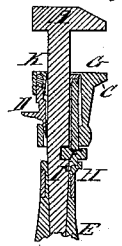
Witnesses                                  Inventor
W. M. Hornor                               O. J. Smith
J. B. Smith

UNITED STATES PATENT OFFICE.

O. J. SMITH, OF WAUWATOSA, WISCONSIN.

IMPROVEMENT IN WRENCHES.

Specification forming part of Letters Patent No. 102,058, dated April 19, 1870.

*To all whom it may concern:*

Be it known that I, O. J. SMITH, of the town of Wauwatosa and State of Wisconsin, have invented a new and useful Improvement in Wrenches; and I do hereby declare that the following is a full, clear, and exact description thereof, which will enable those skilled in the art to make and use the same, reference being had to the accompanying drawing, forming part of this specification, in which—

Figure 1 is a perspective view of my invention; Fig. 2, a sectional view; and Fig. 3, a sectional view, with piece E and jaw C whole.

Similar letters of reference in each of the figures indicate corresponding parts.

The object of my invention is to provide a wrench that can be worked up to any size without turning the screw and taking up the slack with the screw.

A is the permanent jaw on the iron shank; B, the wooden handle fastened on said iron shank; C, the movable jaw; D, sliding stop or wedge, which holds the screw in gear; E, a separate piece, with screw to mesh into screw F; F, screw to move up and back movable jaw C; G, a projection on the shank A, with a hole in it for the end of screw F to work in; H, a loose collar on shank A, with a projection on one side, with a hole in it for the outer end of screw F to work in; I, a pin which passes through a hole, half of which is in the shank A and the other half in the collar H, to hold the collar H firmly in position; K, spiral spring in a hole on the back side of jaw C, into which and on the spring enters stop or wedge D. The spring is to throw the stop out in place. L, screw-nut on the end of shank A, to hold on handle B; M, a dovetail piece on piece E, fitting into a dovetailed groove in jaw C, to hold jaw C and piece together.

Operation: Put the ball of your thumb on piece E, and let the end of your thumb strike the projection on stop D. This will press stop D back and press E out, at the same time releasing the screw, and the jaw C will move back or forward, as desired; or if the jaw C and piece E are made all together, then the whole jaw C will move back and the screw be released. If the jaw C does not fit up to the nut to be removed, then turn the screw F a little, and the work is done.

I claim as my invention—

1. The combination of the jaw and shank A, jaw C, stop or wedge D, piece E, and screw F, substantially as described.

2. The combination of the ring H, shank A, and pin I, substantially as described.

3. The combination of the projection G on shank A, screw F, ring H, and pin I, substantially as described.

O. J. SMITH.

Witnesses:
   J. B. SMITH,
   W. M. HORNOR.